UNITED STATES PATENT OFFICE.

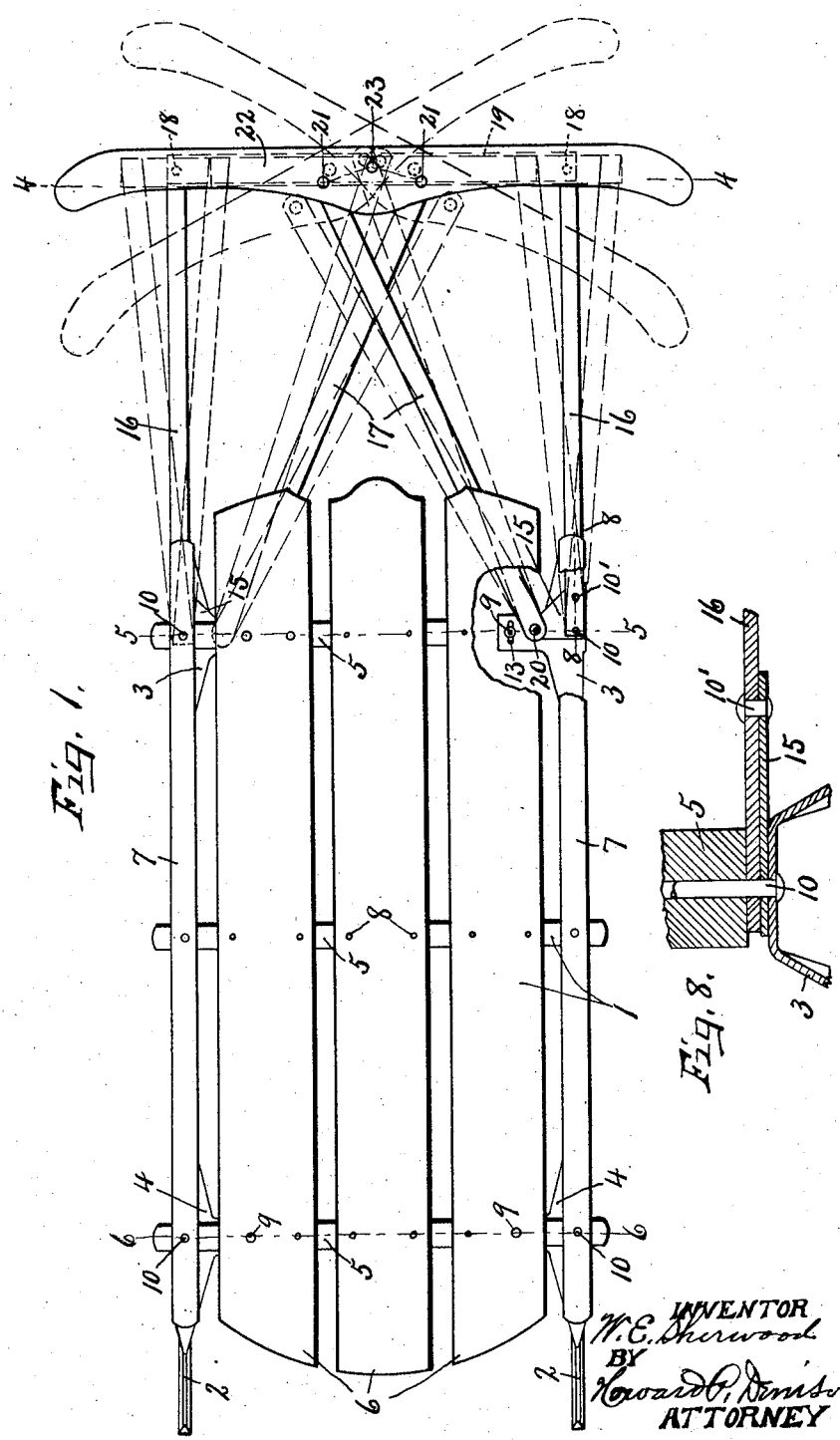

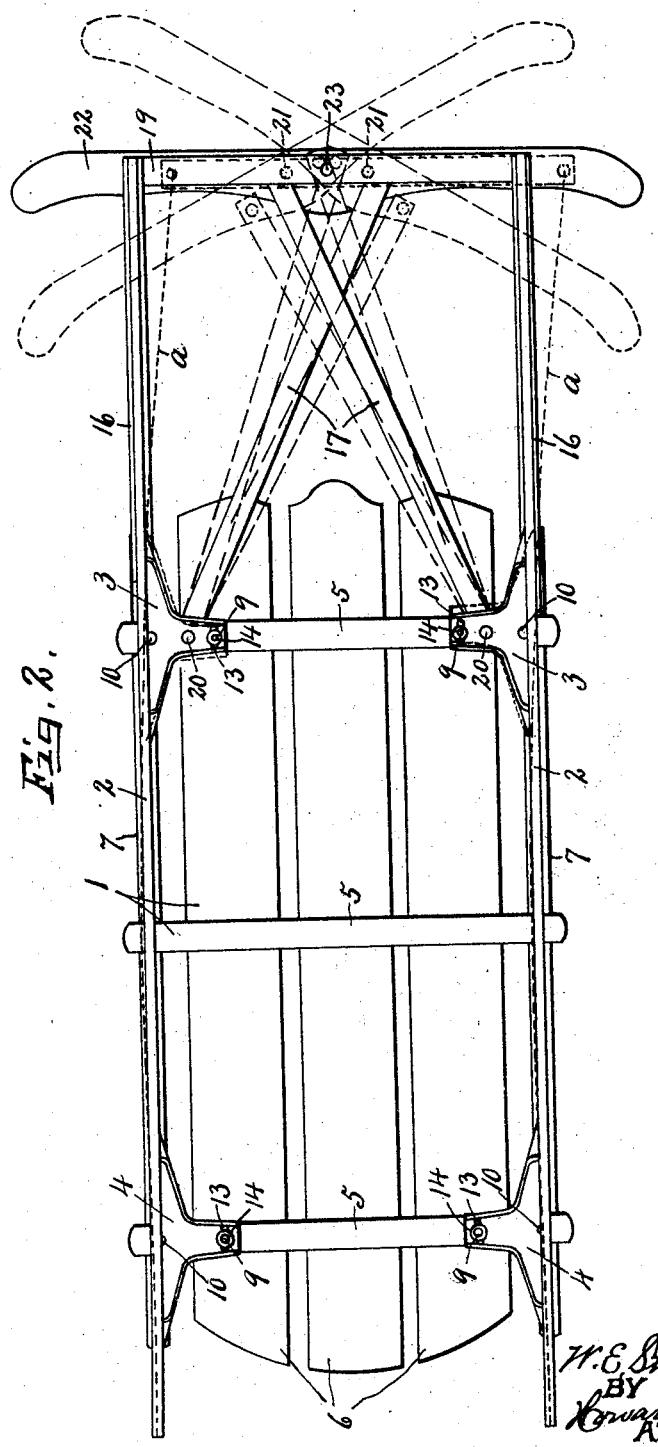

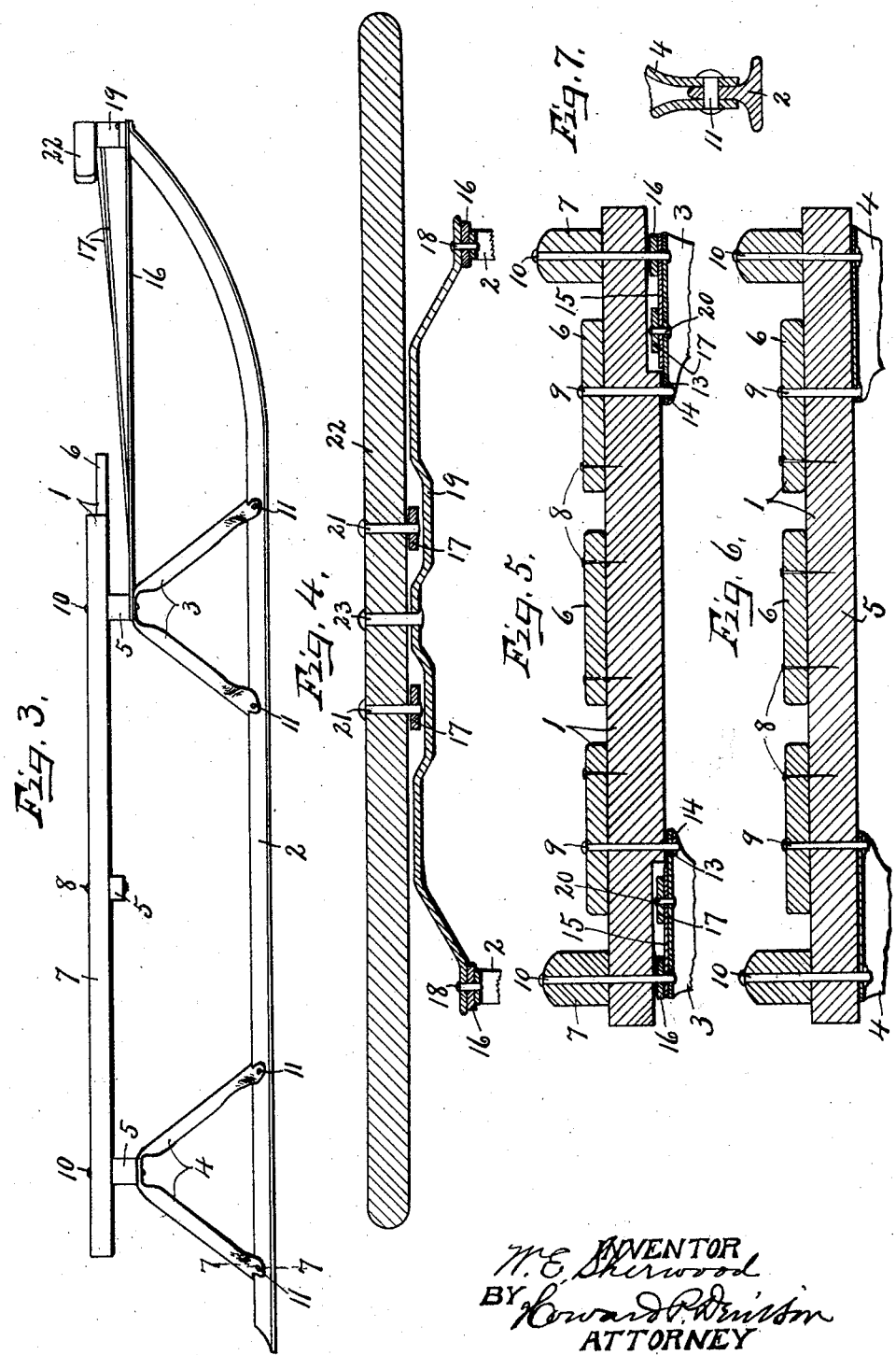

WILLIAM E. SHERWOOD, OF CANASTOTA, NEW YORK.

HAND-SLED.

1,392,083.  Specification of Letters Patent.  Patented Sept. 27, 1921.

Application filed February 3, 1920. Serial No. 355,975.

*To all whom it may concern:*

Be it known that I, WILLIAM E. SHERWOOD, of Canastota, in the county of Madison, in the State of New York, have invented new and useful Improvements in Hand-Sleds, of which the following, taken in connection with the accompanying drawings, is a full, clear, and exact description.

This invention relates to certain improvements in hand sleds in which the steering is accomplished by lateral deflection of the forward ends of the runners through the medium of a suitable lever under the control of the operator and adapted to be operated either by the feet or hands according to the position of the operator on the platform.

The runners are usually made of relatively light bars of resilient steel or equivalent material capable of being sprung laterally for steering purposes, and are connected to the platform by suitable braces which serve to hold the platform some distance above the runners and to maintain proper operative relation between said platform and runners and at the same time to permit the forward ends of the latter to be deflected laterally in reverse directions from normal straight and parallel lines.

I am aware that various devices have heretofore been proposed for producing this lateral deflection of the front ends of the runners through the medium of a pedal or hand-operated lever, but such deflection has usually been limited to the portions of the runners in front of the front braces, and the main object of my present invention is to connect the runners and the platform in such manner that they may be sprung or deflected laterally throughout the major portions of their lengths from front to rear so as to enable the sled to travel around curved courses with greater safety or less liability of overturning than has heretofore been produced in a single sled.

In other words, I have provided a slight turning movement of the braces relatively to the platform so that when the front ends of the runners are deflected from a straight course in either direction, practically the entire length of both runners will be sprung from their normal straight lines to curved lines or relative long radius with the front ends deflected to one side and the rear ends to the opposite side of their respective straight lines, thereby permitting the sled to take relatively short curves without liability of overturning.

One of the specific objects is to pivot the braces to the platform to allow for the slight turning movement necessary to conform to the lateral deflection of the runners and at the same time to enable said braces to properly function in maintaining a strong and durable connection between the runners and platform.

Another object is to provide simple and efficient connections between the operating lever and runners whereby the latter may be easily and quickly deflected from a straight course with a minimum power applied to the lever.

Other objects and uses relating to specific parts of the sled will be brought out in the following description.

In the drawings:—

Figures 1 and 2 are respectively a top plan and an inverted plan of a hand-sled embodying the various features of my invention, the platform being broken away in Fig. 1, to show one of the underlying front braces.

Fig. 3 is a side elevation of the same sled.

Figs. 4, 5, and 6 are enlarged transverse vertical sectional views taken respectively on lines 4—4, 5—5, and 6—6, Fig. 1.

Fig. 7 is an enlarged transverse sectional view through one of the runners and adjacent portion of one of the braces taken on line 7—7, Fig. 3.

Fig. 8 is an enlarged longitudinal vertical sectional view of the upper portion of one of the braces and adjacent reinforcing plate together with the adjacent portion of one of the steering links and a portion of the cross-bar taken on line 8—8, Fig. 1.

As illustrated, this hand-sled comprises a platform or main body —1—, a pair of runners —2—, front and rear sets of braces —3— and —4— connecting the body and runners, and suitable means for springing the runners laterally for steering purposes.

The platform or body —1— preferably consists of a series of, in this instance three, cross-bars —5— arranged in substantially uniformly spaced relation from front to rear for receiving a supporting series of lengthwise boards —6— and opposite lengthwise hand or guard rails —7—, all of which parts are preferably made of wood and rigidly secured together by nails —8— or bolts —9— and —10—, the bolts —9— and —10— being also utilized for other purposes hereinafter described.

This platform overlies the main bodies of the runners and space between them and between the front and rear ends thereof or just at the rear of the upwardly curved front ends of said runners so that the weight of the operator upon the platform will be transmitted to the portions of the runners which are substantially parallel with the platform and which are adapted to engage the surface along which the sled is movable.

The runners —2— extend forwardly and rearwardly beyond the extending ends of the platform in parallel relation a suitable distance apart less than the width of the platform, and are preferably made of steel or equivalent metal having more or less resiliency to permit them to be sprung laterally throughout their entire lengths, the front ends being curved upwardly and terminating in a plane slightly below that of the platform or in approximately the same horizontal plane as that of the under side of the front and rear cross-bars —5—, as shown more clearly in Fig. 3, each runner being made in the form of an inverted T for strength and lightness of weight with the wider portion at the bottom for contact with the surface along which the sled is adapted to move.

Each of the braces —3— and —4— is preferably made of metal such as sheet steel having more or less resiliency and is bent into the form of an inverted V with its apex at the top and its opposite arms diverging downwardly and longitudinally of the runner, the major portion of each arm being also V-shaped in cross section to form opposite flanges the lower ends of which engage opposite faces of the central lengthwise rib of the runner and are rigidly secured thereto by bolts or rivets —11—, as shown more clearly in Fig. 7.

The upper portion or apex of each brace is substantially flat and elongated and extends inwardly along the under side of its extending cross-bar some distance beyond the vertical plane of the runner and is attached to said cross-bar in a manner presently described to hold said runner in a vertical position.

The front set of braces —3— are attached to the under side of the opposite ends of the front cross-bar —5— while the rear set of braces —4— are similarly attached to the under side of the opposite ends of the rear cross-bar —5— each brace being pivoted near the outer end of its flat apex by one of the bolts —10— to the corresponding cross-bar to permit a slight horizontal rocking movement thereof, the inner end of the flat apex of each brace being provided with a longitudinally elongated slot —13— for receiving the corresponding bolt —9— and allowing the horizontal rocking movement of the brace previously referred to, while at the same time the bolts —9— and —10— serve to hold the braces and their runners in a substantially vertical position and in operative relation to the platform —1—, the bolts —10— also serving to secure the side rails —7— to the cross-bars.

The bolts —9— are provided with enlarged heads or washers —14— engaging the lower faces of the flattened upper portions of the braces for additionally holding the latter in vertical positions.

Each of the front braces —3— is provided with a reinforcing plate of flange —15— secured to the upper flat face or apex thereof and extending forwardly therefrom and also extending inwardly from the pivotal bolt —10— but terminating short of the clamping bolt —9— for the same brace, the object of the reinforcement being to strengthen the brace at its points of connection with a pair of steering links as —16— and —17— for that particular brace, it being understood that the opposite front brace is operated by a similar pair of steering links.

The links —16— extend forwardly from the front cross-bar —5— in substantially horizontal planes parallel with each other and directly over their respective runners and have their rear ends rigidly secured to their respective reinforcing plates —15— and corresponding brace by the pivotal bolts —10— and additional bolts —10'—, the latter being located a short distance in front of the pivotal plates —10—, the front ends of the same links being pivotally connected by bolts —18— to the underlying front ends of their respective runners —2— and to the opposite ends of a metal cross-bar —19— which latter is parallel with the cross-bars —5— of the platform and overlies the front ends of the runners and therefore serve to hold the front ends of said runners in fixed relation to each other through the medium of the plates —18—.

The links —17— are pivoted by bolts —20— to the inner ends of the reinforcing plates —15— and adjacent braces —3— a short distance inwardly from the pivotal bolts —10— and extend forwardly across each other between the front end of the platform —1— and metal cross-bar —19—, the front ends thereof being pivotally connected by bolts —21— to the under side of a steering lever —22— which in turn is pivotally connected by a bolt —23— midway between its ends to the center of the metal cross-bar —19—.

The central portion of the metal cross-bar —19— is arched upwardly above the plate to support the steering lever —22— in approximately the same horizontal plane as the platform —1—, said steering lever being extended some distance beyond the opposite ends of the metal cross-bar —19— where the ends thereof may be readily engaged by the feet or hands of the operator for rocking it horizontally about its central pivot —23— to produce the desired lateral springing or deflection of the front ends of the runners.

*Operation.*

Assuming now that the various parts of the steering mechanism are in the their normal positions as shown by full lines in Figs. 1 and 2 and that it is desired to steer to the right, in which case the left-hand end of the lever —22— would be pushed forwardly or the right-hand end drawn rearwardly, thereby rocking said lever about its pivot —23— on the metal cross-bar —19— to or toward the corresponding dotted position.

By this operation the pivotal bolt —23— and left-hand pivotal bolt —21— are caused to rock about the axis of the right-hand pivotal bolt —21— as a fulcrum, the angular shifting movement of the pivotal bolt —23— which is attached to the metal cross-bar —19— about the right-hand pivot —21— serving to shift said metal cross-bar and front ends of the runners connected thereto in the same direction, or to the right of their normal straight lines.

At the same time a rearward end thrust is produced upon the link —17— which is connected to the inner end of the front left-hand brace, tending to turn that brace about its pivot —10— while the link —17—, connected to the inner end of the right-hand brace, is drawn forwardly to produce a corresponding turning movement of the front right-hand brace about its pivot —10—.

These two movements, that is, the lateral deflecting of the front ends of the runners by the shifting of the cross-bar —19— and the simultaneous turning movement of both of the front braces, coöperate to spring all portions of the runners from the front ends to their rear ends, and owing to the fact that the rear braces are also pivoted and have a slight horizontal rocking movement, it is evident that they will readily conform to the deflected positions of their respective runners.

In other words, during this operation of the steering lever, while the front ends of both runners will be deflected to the right, the intermediate portions will be bowed outwardly to the left, thus causing the rear braces to turn in a direction opposite to that of the front braces.

It therefore follows that when the front ends of the runners are deflected in the direction in which it is desired to steer, the rear ends will be slightly deflected in an opposite direction in a manner somewhat similar to the front and rear steering wheels of a four-wheel vehicle, and permits the sled to be safely steered around relatively short curves at high speed without liability of overturning.

The horizontal turning movement of the front set of braces is always greater than that of the rear braces, but the arms of both sets are more or less resilient or yielding laterally between their points of attachment with the runner and platform which allows the runners to be curved laterally to a still shorter radius than that permitted by the slots —13— of the braces of the front set, it being understood that the runners as well as the braces are tensioned to normally assume straight, parallel lines when the operating lever is free or returned to its normal position, as produced by the return of the runners to their normal positions under their own tension through the medium of the metal cross-bar —19— and links —17—.

The longitudinally curved dotted lines —a— indicate the deflected positions of the runners when the operating lever is rocked in one direction, as for example, to the left, it being understood that the runners will assume a reverse curvature of substantially the same arc when the lever is rocked in the opposite direction to the same angle.

What I claim is:

1. In a hand-sled, the combination of a platform, braces secured to the platform, runners secured to the braces, and having forwardly upwardly curved front ends, a cross-bar connecting the front ends of the runners, a lever pivotally mounted on the cross-bar, links crossing each other between the lever and platform and having their rear ends connected to the braces and their front ends connected to the lever at opposite sides of its pivot.

2. In a hand-sled, the combination of a platform, braces secured to the platform, runners secured to the braces, and having forwardly upwardly curved front ends, a cross-bar connecting the front ends of the runners, a lever pivotally mounted on the cross-bar, links crossing each other between the lever and platform and having their rear ends connected to the braces and their front ends connected to the lever at opposite sides of its pivot, and additional links connecting the ends of the cross-bar with the platform.

3. In a hand sled, the combination of a platform, braces secured to the platform, runners secured to the braces, a cross-bar connecting the front ends of the runners, a lever pivoted to the cross-bar, links connected to the lever at opposite sides of its pivot and crossing each other at the rear of the lever and having their rear ends connected to said braces.

4. A hand sled comprising a platform, braces pivoted to the platform and extending inwardly from their pivots, runners secured to the braces, a cross-bar connecting the front ends of the runners, a lever pivoted to the cross-bar, and links attached to the braces some distance inwardly beyond their pivots and also connected to the lever.

In witness whereof I have hereunto set my hand this 31st day of Dec., 1919.

WILLIAM E. SHERWOOD.

Witnesses:
E. C. Brown,
B. K. Brown.